United States Patent [19]
Akiba et al.

[11] Patent Number: 5,966,228
[45] Date of Patent: Oct. 12, 1999

[54] OPTICAL TRANSMISSION SYSTEM AND OPTICAL REPEATER

[75] Inventors: Shigeyuki Akiba; Shu Yamamoto; Masatoshi Suzuki; Noboru Edagawa; Hidenori Taga, all of Tokyo, Japan

[73] Assignee: Kokusai Denshin Denwa Kabushiki Kaisha, Tokyo, Japan

[21] Appl. No.: 08/756,609

[22] Filed: Nov. 26, 1996

[30] Foreign Application Priority Data

Dec. 4, 1995 [JP] Japan ................................. 7-314976

[51] Int. Cl.$^6$ .................................................. H04B 10/18
[52] U.S. Cl. ......................... 359/173; 359/161; 359/179
[58] Field of Search ................................. 359/124, 127, 359/130, 161, 173, 179

[56] References Cited

U.S. PATENT DOCUMENTS

| | | | |
|---|---|---|---|
| 5,606,445 | 2/1997 | Kikuchi et al. | 359/161 |
| 5,701,188 | 12/1997 | Shigematsu et al. | 359/161 |
| 5,754,322 | 5/1998 | Ishikawa et al. | 359/135 |

*Primary Examiner*—Leslie Pascal
*Attorney, Agent, or Firm*—Christie, Parker & Hale, LLP

[57] ABSTRACT

An optical transmission system comprises transmission optical fibers 14 connected between an optical transmission terminal 10 and an optical receiving terminal 12 via optical amplifying repeaters 16, and equalizing fiber 18 each connected in each equalizing interval. The equalizing fiber 18 is typically located at the terminal end of each equalizing interval. Each transmission optical fiber 14 is a dispersion-shifted fiber whose wavelength dispersion is substantially zero in a specific band, for example, 1.5 $\mu$m. The optical amplifying repeaters 16 include an optical amplifier, and a dispersion compensating optical element having wavelength dispersion characteristics that exhibit an inclination opposite from that of wavelength characteristics of wavelength dispersion of the transmission optical fiber 14 (more specifically, a minus inclination with respect to the wavelength). The dispersion compensating optical element compensates offset values of cumulative wavelength dispersion among different wavelengths. The dispersion compensating optical element can be made by a fiber grating technology.

6 Claims, 12 Drawing Sheets

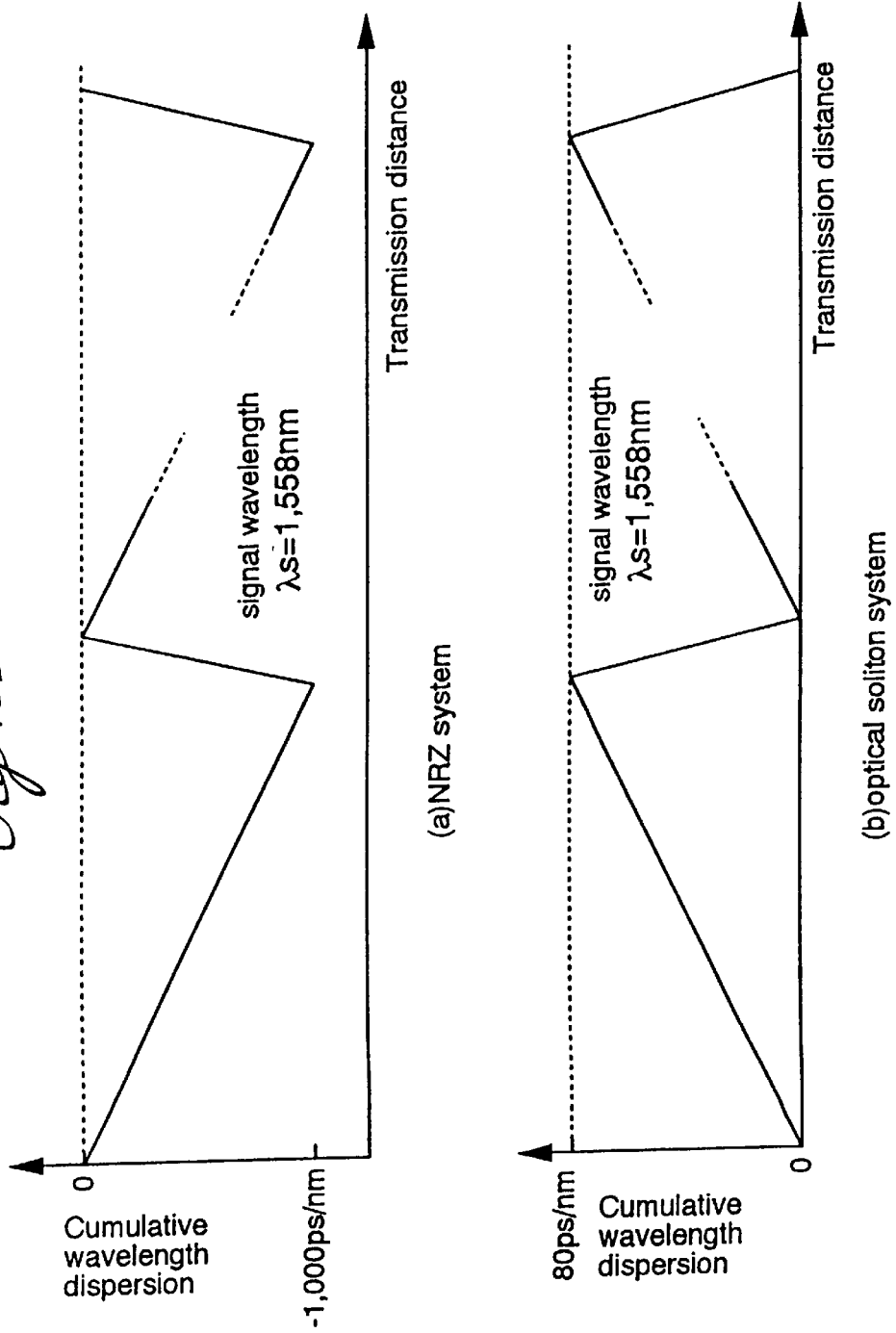
Fig. 11 (a) NRZ system
Fig. 12 (b) optical soliton system (a) NRZ system (b) optical soliton system

OPTICAL TRANSMISSION SYSTEM AND OPTICAL REPEATER

BACKGROUND OF THE INVENTION

1. Field of the Invention

This invention relates to an optical transmission system and an optical repeater and more particularly to a long-distance and/or wide-band optical transmission system using optical fibers and an optical repeater used in the optical transmission system.

2. Related Art

Long-distance optical transmission systems such as submarine cables, in general, use a nonreturn-to-zero (NRZ) system that transmits rectangular optical pulses or an optical soliton transmission system that transmits solitary pulses. The optical soliton transmission system transmits ultra-short optical pulses over a long distance while holding their pulse forms unchanged, by balancing the non-linearity characteristics and the wavelength dispersion (or chromatic dispersion) characteristics of optical fibers. There is a report on a successful transmission over the ultra-long distance as long as 14,000 km by ultra-high speed transmission as high as 20 gigabits/second.

In any of the transmission systems, optical fibers for transmission are designed so that their wavelength dispersion characteristics be a limited value for the signal wavelength $\lambda s$, in order to prevent deterioration in transmission characteristics caused by the non-linearity of the optical fibers. However, since the wavelength dispersion has a certain value other than zero, the wave dispersion value accumulates and increases gradually according to the transmission distance, and the transmission waveform has been largely deteriorated.

Under the circumstances, there is a proposal that limits the cumulative value of wavelength dispersion within a predetermined value. This proposal uses dispersion compensating fibers (equalizing fibers) inserted among transmission optical fibers and having the opposite wavelength dispersion characteristics, such that wavelength dispersion as a whole becomes zero or quite small. FIG. 10 schematically shows a system of this type. Connected between an optical transmitter terminal 110 and an optical receiver terminal 112 are transmission optical fibers 114 (optical fibers called dispersion-shifted fibers whose wavelength dispersion becomes substantially zero in the band of 1.5 $\mu$m) via optical amplifying repeaters 116. An equalizing fiber 118 is connected in each equalizing interval. For example, a single transmission optical fiber is about 40 km long, and each equalizing interval is about 500 km in NRZ transmission system and 200 km in optical soliton transmission system, although the values depend on various system designs.

FIGS. 11 and 12 show a graph of cumulative wavelength dispersion values varying with transmission distance. FIG. 11 shows the case of NRZ system, and FIG. 12 shows the case of optical soliton system, taking cumulative wavelength dispersion on vertical axes and transmission distance on horizontal axes. Typically, optical fibers used in NRZ system are designed such that their wavelength dispersion be accumulated on the minus side while those in optical soliton system are designed such that their wavelength dispersion be accumulated in the plus side.

FIG. 13 schematically shows a construction of the optical amplifier repeater 116 for the band of the wavelength 1,500 nm. An output laser beam from a pumping LD (laser diode) module 124 is introduced to an erbium-doped fiber 120 via a WDM (wavelength division multiplex) coupler 122 to excite the erbium-doped fiber 120. Located downstream of the WDM coupler 122 is an optical isolator 126 for blocking off any reflective light. Some optical soliton transmission systems further include an optical filter positioned downstream of the optical isolator 126. The optical filter is a band pass filter that permits optical signals in the band of the signal wavelength alone to pass through.

A wavelength division multiplexing system is considered useful as means for further increasing the transmission capacity. If the wavelength division multiplexing system is applied to the optical transmission line relying on wavelength dispersion compensation as shown in FIG. 10, then the following disadvantages occur. That is, since both the transmission optical fiber 114 and the equalizing fiber 118 have wavelength dispersion characteristics that exhibit a positive inclination relative to the wavelength, even if wavelength dispersion of a certain wavelength can be compensated to zero by the equalizing fiber 118, wavelength dispersion of other wavelengths cannot be reduced to zero.

FIG. 14 schematically shows wavelength characteristics of wavelength dispersion of the transmission optical fiber 114 and the equalizing fiber 118, taking wavelength dispersion on the vertical axis and wavelengths on the horizontal axis. For NRZ transmission system, the transmission optical fiber 114 is designed such that its cumulative wavelength dispersion in each equalizing interval approximately exhibits the characteristics A while the equalizing fiber 118 is designed to have the characteristics B. For optical soliton transmission system, in contrast, the transmission optical fiber 114 is designed such that its cumulative wavelength dispersion in each equalizing interval exhibits the characteristics B while the equalizing fiber 118 is designed to have the characteristics A. In the design, of course, wavelength dispersion in each unit distance is determined such that the cumulative value in each transmission distance be reduced to zero or quite a small value by addition.

It is known from FIG. 14 that, even if the wavelength dispersion of the transmission optical fiber 114 can be reduced to zero by the equalizing fiber 118 in regard of a certain wavelength $\lambda m$, wavelength dispersion in regard of adjacent other wavelengths $\lambda a$ and $\lambda b$ cannot be reduced to zero. This difference is accumulated according to the transmission distance, and amounts to a non-negligible value. FIGS. 15 and 16 shows cumulative wavelength dispersion in relation to the transmission distance when three wavelengths, 1,555 nm, 1,558 nm and 1,561 nm are wavelength-division-multiplexed. FIG. 15 shows the case of NRZ system and FIG. 16 shows the case of optical soliton transmission system. Both graphs take cumulative wavelength dispersion on vertical axes and transmission distance on horizontal axes.

Preferable wavelength dispersion in every 1 km in NRZ transmission system is considered −2.0 ps/nm approximately. In a certain design employing the wavelength division multiplexing system, wavelength dispersion per 1 km is −2.0 ps/nm for the wavelength of 1,558 nm, −2.3 ps/nm for the wavelength of 1,555 nm, −1.7 ps/nm for the wavelength of 1,561 nm, and inclination of the wavelength dispersion in 1 km relative to the wavelength is 0.1 ps/nm/nm. That is, the difference of 3 nm in signal wavelength results in the difference of 0.3 ps/nm in wavelength dispersion in every 1 km. If the full length of the transmission optical fiber 114 in each equalizing interval is 500 km, and if the equalizing fiber 118 reduces cumulative wavelength dispersion for the wavelength $\lambda s$=1,558 nm into zero, cumulative wavelength dispersion of a shorter wavelength deviates in the minus direction, and that of a longer wavelength deviates in the plus direction as shown in FIG. 15. That is, in regard of wavelengths other than the center wavelength λs=1,558 nm, even the equalizing fiber 118 cannot fully compensate the cumulative wavelength dispersion, and the offset value of cumulative wavelength dispersion increases with the transmission distance.

Preferable wavelength dispersion in every 1 km for optical soliton transmission system is considered 0.4 ps/nm approximately. In a certain design employing the wavelength division multiplexing system, wavelength dispersion in 1 km is 0.4 ps/nm for the wavelength of 1,558 nm, 0.19 ps/nm for the wavelength of 1,555 nm, 0.61 ps/nm for the wavelength of 1,561 nm, and inclination of the wavelength dispersion in every 1 km relative to the wavelength is 0.07 ps/nm/mn. Then, the difference of 3 nm in signal wavelength results in the difference of 0.21 ps/nm in wavelength dispersion in 1 km. If the full length of the transmission optical fiber 114 in each equalizing interval is 200 km, and if the equalizing fiber 118 reduces cumulative wavelength dispersion for the wavelength λs=1,558 nm into zero, cumulative wavelength dispersion of a shorter wave length deviates in the minus direction, and that of a longer wavelength deviates in the plus direction as shown in FIG. 16. Even in the optical soliton transmission system, in regard of wavelengths other than the center wavelength λs=1,558 nm, the equalizing fiber 118 cannot fully compensate the cumulative wavelength dispersion, and the offset value of cumulative wavelength dispersion increases with the transmission distance.

OBJECT AND SUMMARY OF THE INVENTION

It is therefore an object of the invention to provide an optical transmission system and an optical repeater that overcome the problems caused by employment of a wavelength division multiplexing system.

Another object of the invention is to provide an optical transmission system and an optical repeater that reduces or removes the dependency of wavelength dispersion on wavelengths.

According to the invention, a dispersion compensating optical means is used to reduce any difference in wavelength dispersion among different wavelengths in an optical transmission line to substantially zero, for example. In this manner, also when a wavelength division multiplexing system is used for transmission, wavelength dispersion values of different wavelengths can be shifted to a constant value, and long-distance and/or wide-band transmission can be realized by using dispersion compensation by an equalizing fiber used for typical transmission using a single wavelength.

When the dispersion compensating optical means is provided in an optical repeater, easier connection of the dispersion compensating optical means is promised. The optical repeater preferably includes an optical amplifying means.

When the dispersion compensating optical means has the form of an optical fiber, its connection to the transmission optical fiber and others will be easier. The dispersion compensating optical means may have a fiber grating that is advantageous for realizing any desired wavelength characteristics of wavelength dispersion.

BRIEF DESCRIPTION OF THE DRAWINGS

FIGS. 11 and 12 are diagrams showing cumulative wavelength dispersion values in respective transmission distances;

DESCRIPTION OF THE PREFERRED EMBODIMENTS

An embodiment of the invention is described below in detail with reference to the drawings.

Figure 1:
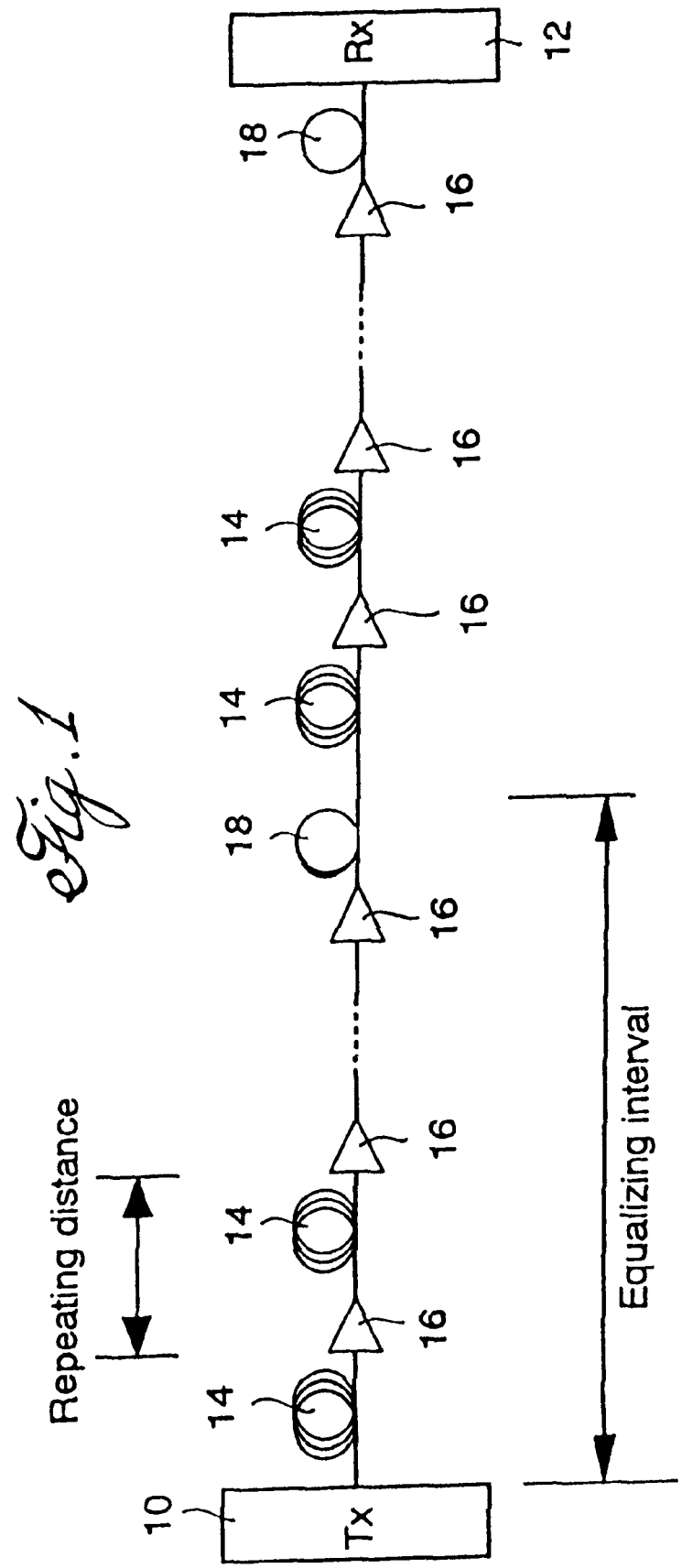
FIG. 1 is a diagram showing a general construction of a system according to an embodiment of the invention.

FIG. 1 schematically shows a general construction of an embodiment of the invention applied to a wavelength division multiplexing system for the band of 1.5 μm. Connected between an optical transmitter terminal 10 and an optical receiver terminal 12 are transmission optical fibers 14 via optical amplifying repeaters 16. An equalizing fiber 18 is connected in each equalizing interval. The equalizing fiber 18 is typically placed at the final end of each equalizing interval. The transmission optical fibers 14 may be, for example, optical fibers whose wavelength dispersion becomes substantially zero in the band of 1.5 μm (so-called dispersion-shifted fibers).

Similarly to the conventional system discussed above, the length of each transmission optical fiber 14 (that is, the repeating distance) is about 40 km, and each equalizing interval is about 500 km for NRZ transmission system and 200 km for optical soliton transmission system. The equalizing fiber 18, like the equalizing fiber 118, is designed to compensate wavelength dispersion of the center wavelength λs=1,558 nm by the transmission optical fibers 14 in each equalizing interval.

The optical amplifying repeater 16 used in the embodiment amplifies optical signals in the band of 1.5 μm, and compensates an offset value of cumulative wavelength dispersion of a respective wavelength by using wavelength dispersion characteristics that exhibit an inclination opposite to that of wavelength dispersion characteristics of the transmission optical fiber 14 (more specifically, a minus inclination relative to the wavelength). In this manner, if three wavelengths 1,555 nm, 1,558 nm and 1,561 nm, for example, are used for the wavelength division multiplexing system, wavelength dispersion of the wavelengths 1,555 nm and 1,561 nm of the transmission optical fiber 14 are shifted to substantially coincide with the wavelength dispersion of the wavelength 1,558 nm. As a result, wavelength dispersion values different among respective wavelengths in the transmission optical fiber 14 are brought into coincidence with the constant value independent from the wavelengths by the optical amplifying repeater 16, such that any difference in cumulative wavelength dispersion among different wavelengths that appears after equalization by the equalizing fiber 18 only includes the difference in wavelength dispersion inherent to the wavelength dependency of the equalizing fiber 18, and this difference is negligibly small.

Figure 2:
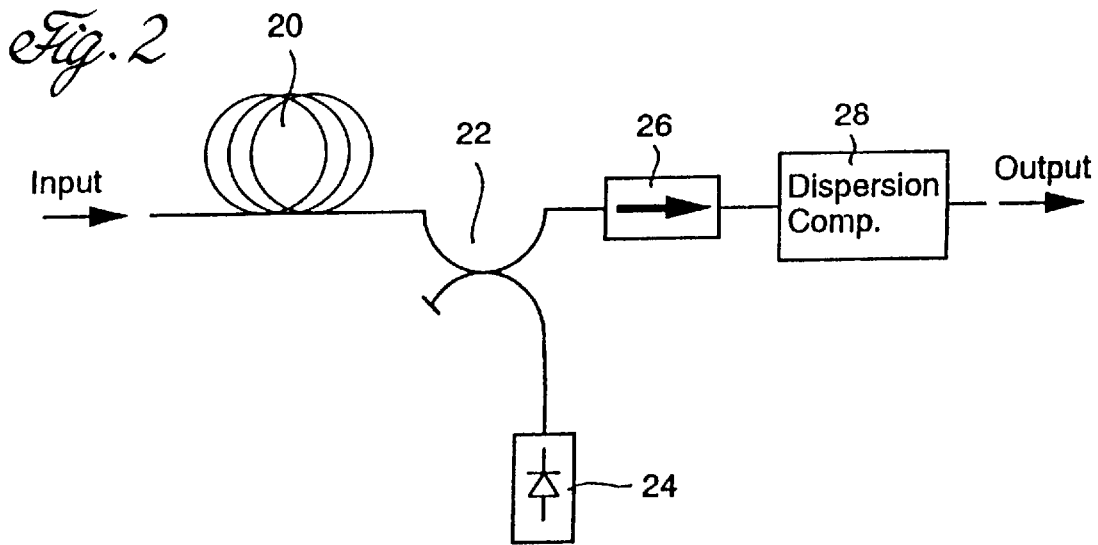
FIG. 2 is a block diagram of an optical amplifying repeater 16 suitable for NRZ transmission system.

A general construction of the optical amplifying repeater 16 suitable for NRZ transmission system is schematically shown in FIG. 2. Although it is essentially the same as the conventional one, it is characterized in that a dispersion compensating element having wavelength dispersion characteristics with a minus inclination relative to the wavelength is provided at the optical output end. An output laser beam from a pumping LD (laser diode) module 24 is introduced to an erbium-doped fiber 20 via a WDM coupler 22 to excite the erbium-doped fiber 20. Located downstream of the WDM coupler 22 is an optical isolator 26 to cut off any reflected light. Further placed downstream of the optical isolator 26 is a dispersion compensating optical element 28 that compensates deviations in wavelength dispersion of respective wavelengths in the transmission optical fiber 14 connected upstream of the optical amplifying repeater 16.

Figure 3:
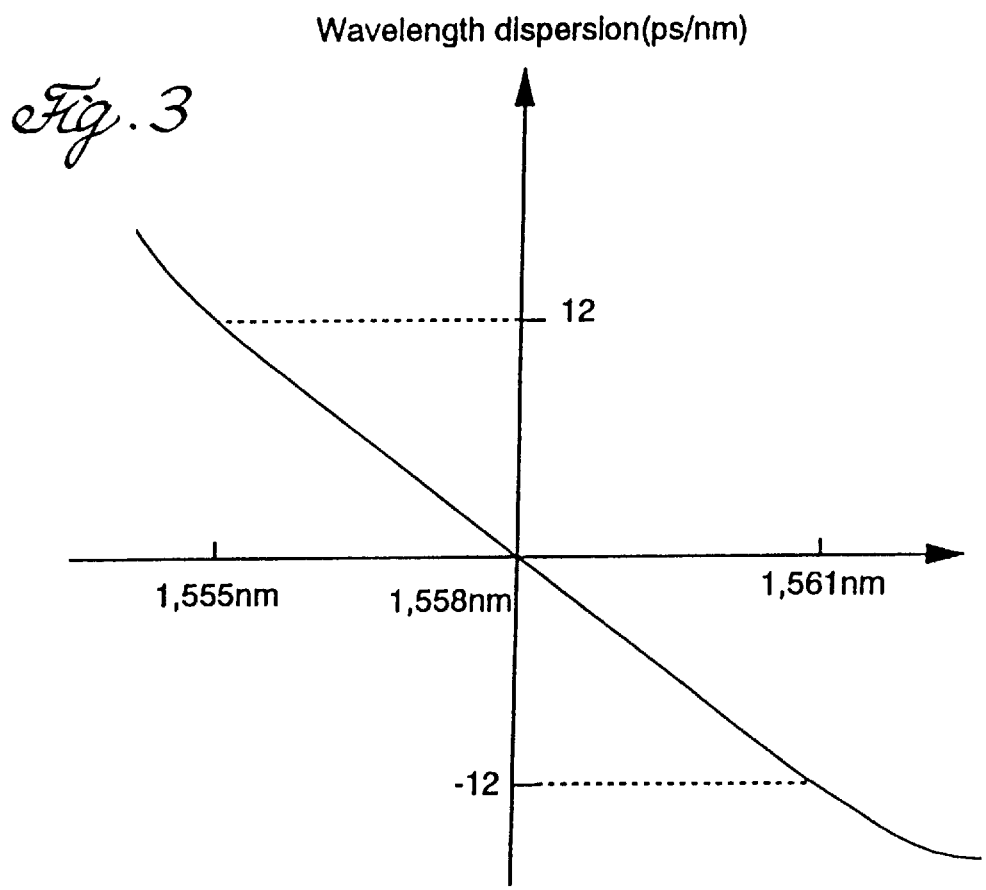
FIG. 3 is a diagram showing wavelength dispersion characteristics of a dispersion compensating optical element 28 for NRZ transmission system.

FIG. 3 shows wavelength dispersion characteristics required for the dispersion compensating optical element 28 for NRZ transmission system. The dispersion compensating element 28 exhibits zero dispersion in regard of the center wavelength 1,558 nm, but gives a plus dispersion for the wavelength 1,555 nm and a minus dispersion for the wavelength 1,561 nm.

In the foregoing example of numerical values for NRZ transmission system, the difference of 3 nm in signal wavelength causes the difference of 0.3 ps/nm in wavelength dispersion in every 1 km. Since the repeating distance is 40 km, the difference in cumulative wavelength dispersion among wavelengths different by 3 nm becomes 12 ps/nm. Therefore, as shown in FIG. 3, the dispersion compensating optical element 28 should be designed to exhibit zero dispersion for the center wavelength 1,558 nm, dispersion of 12 ps/nm for the wavelength 1,555 nm, and dispersion of −12 ps/nm for the wavelength 1,561 nm.

Figure 4:
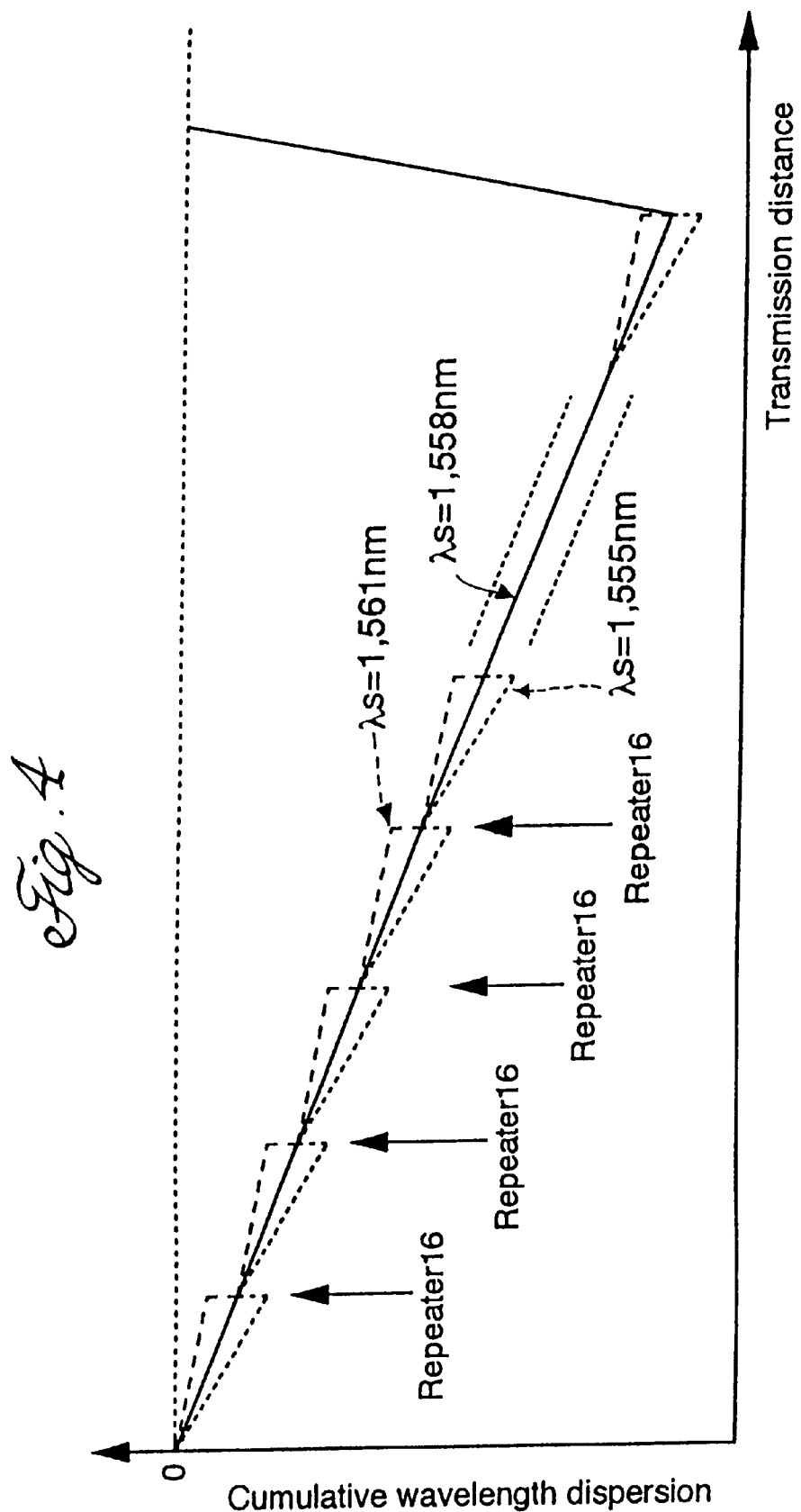
FIG. 4 is a diagram showing transmission distance versus cumulative wavelength dispersion characteristics obtained by the use of the dispersion compensating optical element 28 having the characteristics shown in FIG. 3.

FIG. 4 shows cumulative wavelength dispersion characteristics relative to the transmission distance, which is represented by the dispersion compensating optical element 28 having the characteristics shown in FIG. 3. The dispersion compensating optical element 28 of each optical amplifying repeater 16 does nothing to optical signals with the center frequency 1,558 nm, shifts the cumulative wavelength dispersion of the wavelength 1,555 nm into coincidence with the cumulative wavelength dispersion of the wavelength 1,558 nm, and shifts the cumulative wavelength dispersion of the wavelength 1,561 nm into coincidence with the cumulative wavelength dispersion of the wavelength 1,558 nm.

Figure 5:
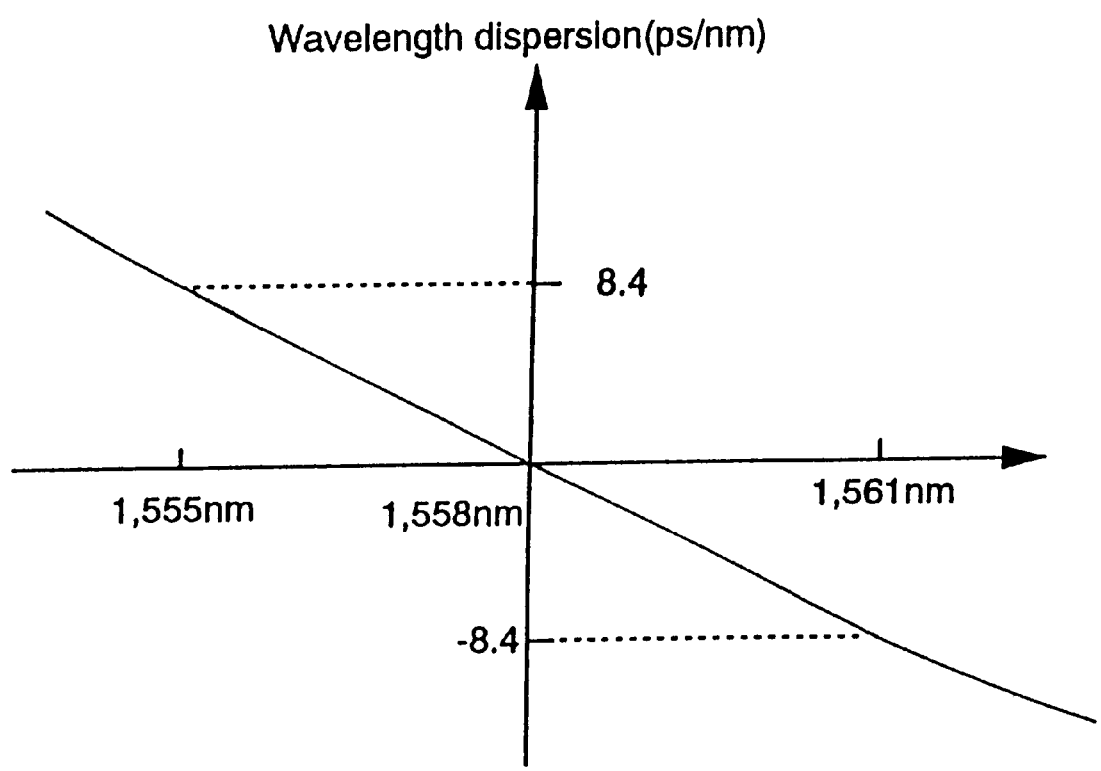
FIG. 5 is a diagram showing wavelength dispersion characteristics of the dispersion compensating optical element 28 for optical soliton transmission system.

Wavelength dispersion characteristics required for the dispersion compensating optical element 28 for optical soliton transmission system are shown in FIG. 5. Also for optical soliton transmission system, the dispersion compensating optical element 28 exhibits zero dispersion for the center wavelength 1,558 nm, but gives a plus dispersion for the wavelength 1,555 nm, and a minus dispersion for the wavelength 1,561 nm.

In the foregoing example of numerical values for optical soliton transmission system, the difference of 3 nm in signal wavelength causes the difference of 0.21 ps/nm in wavelength dispersion in every 1 km. Since the repeating distance is 40 km, the difference in cumulative wavelength dispersion among wavelengths different by 3 nm becomes 8.4 ps/nm. Therefore, as shown in FIG. 5, the dispersion compensating optical element 28 should be designed to exhibit zero dispersion for the center wavelength 1,558 nm, wavelength dispersion of 8.4 ps/nm for the wavelength 1,555 nm, and wavelength dispersion of −8.4 ps/nm for the wavelength 1,561 nm.

Figure 6:
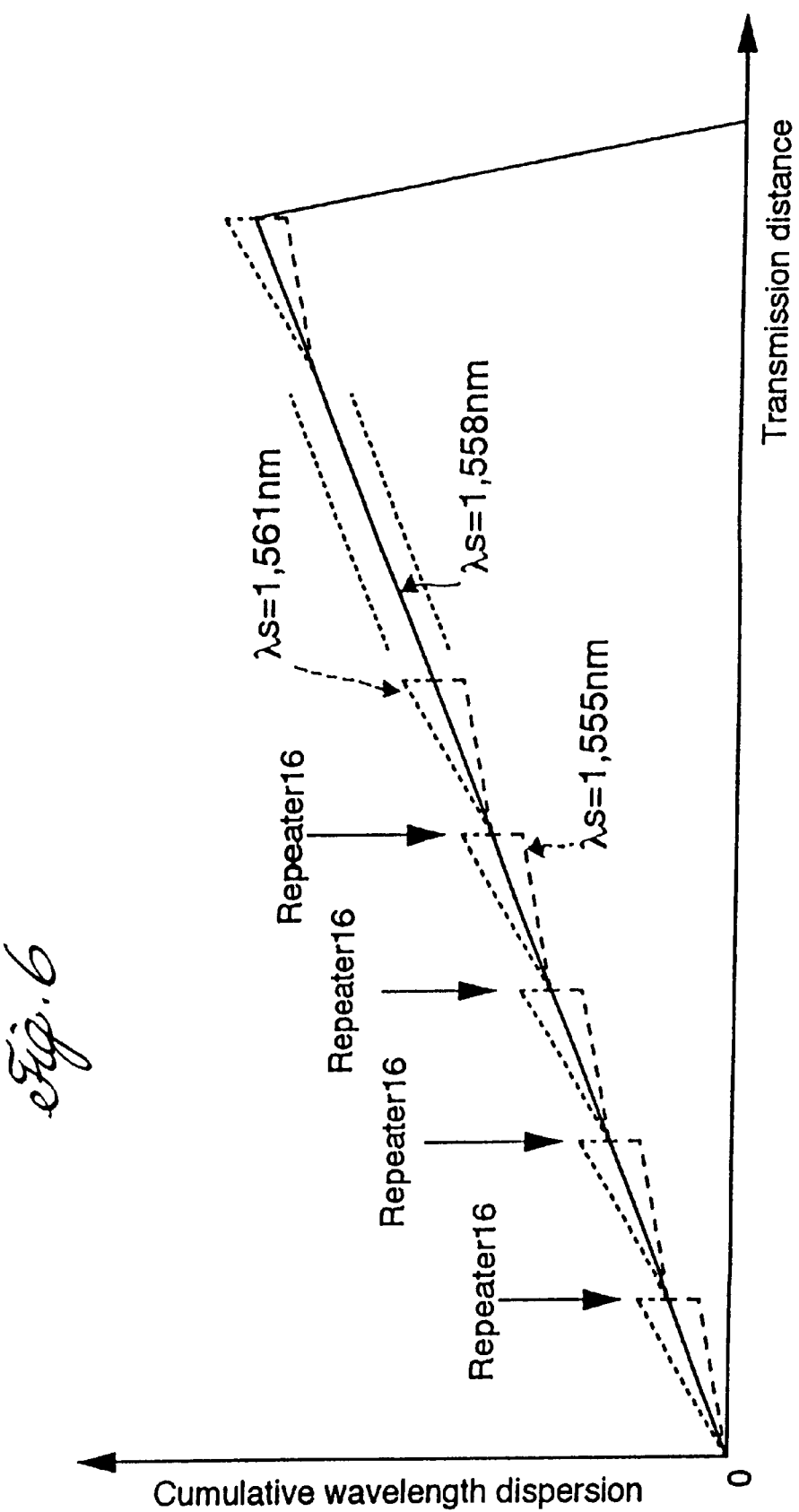
FIG. 6 is a diagram showing transmission distance versus cumulative wavelength dispersion characteristics obtained by the use of the dispersion compensating optical element 28 having the characteristics shown in FIG. 5.

FIG. 6 shows cumulative wavelength dispersion characteristics relative to the transmission distance, which is represented by the dispersion compensating optical element 28 having the characteristics shown in FIG. 5. The dispersion compensating optical element 28 of each optical amplifying repeater 16 does nothing to optical signals with the center frequency 1,558 nm, shifts the cumulative wavelength dispersion of the wavelength 1,555 nm into coincidence with the cumulative wavelength dispersion of the wavelength 1,558 nm, and shifts the cumulative wavelength dispersion of the wavelength 1,561 nm into coincidence with the cumulative wavelength dispersion of the wavelength 1,558 nm.

In this manner, the dispersion compensating element 28 having the wavelength dispersion characteristics that incline in the minus direction relative to the wavelength can be realized by selecting an appropriate composition and waveguide construction. The dispersion compensating optical element 28 is preferably in form of an optical fiber to facilitate reliable connection to other optical fibers and to promise its easier use.

Figure 7:
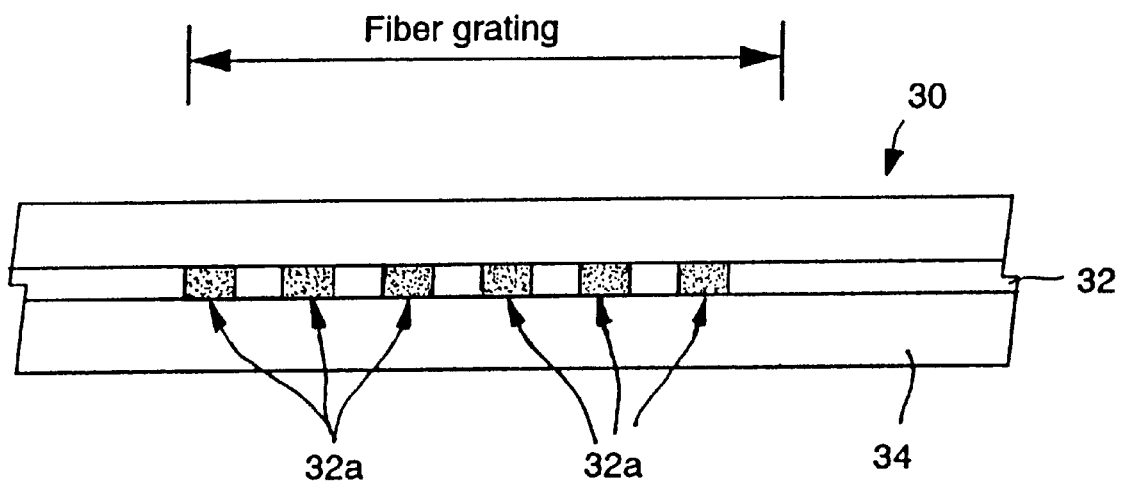
FIG. 7 is a diagram schematically showing a general construction of the dispersion compensating optical element 28 obtained by a fiber grating technology.

The dispersion compensating optical element 28 can be obtained by using, for example, a fiber grating technology. FIG. 7 shows a general construction of the element 28 so made. After a step-index-core type optical fiber 30 doped with germanium undergoes hydrogen treatment, it is exposed to ultraviolet rays via a phase mask. Thus, the core 32 results in including selective portions with a higher refractive index, which appear in predetermined intervals along the longitudinal direction of the core 32. Numeral 32a denotes the higher refractive portions of the core 32, and 34 denotes clad portion. The pitch of the phase mask was 1,078 nm, and ultraviolet rays were irradiated for five minutes from a KrF laser for the wavelength of 247 nm which was used as the ultraviolet source. The length of the grated portion of the core 32 was 10 mm.

Figure 8:
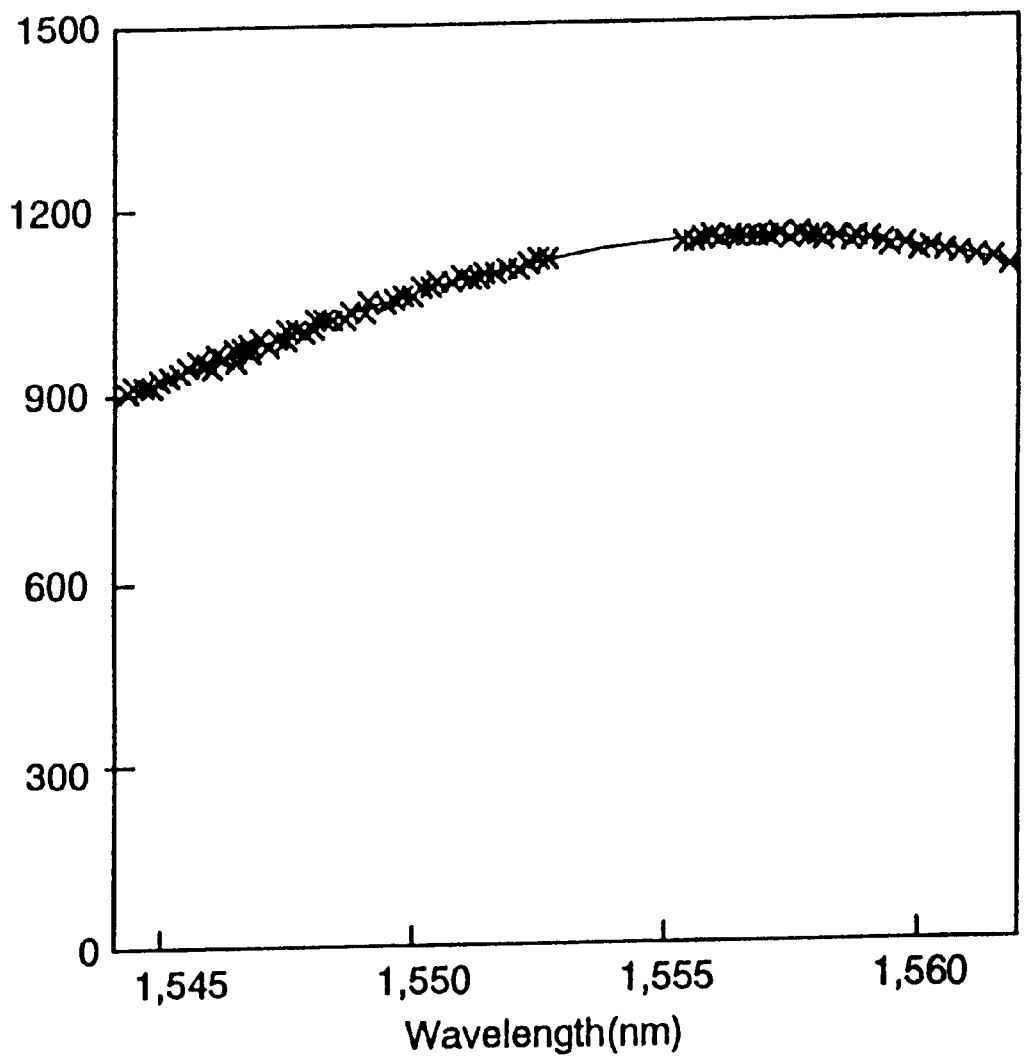
FIG. 8 is a diagram showing group delay characteristics of the fiber grating shown in FIG. 7.
Figure 9:
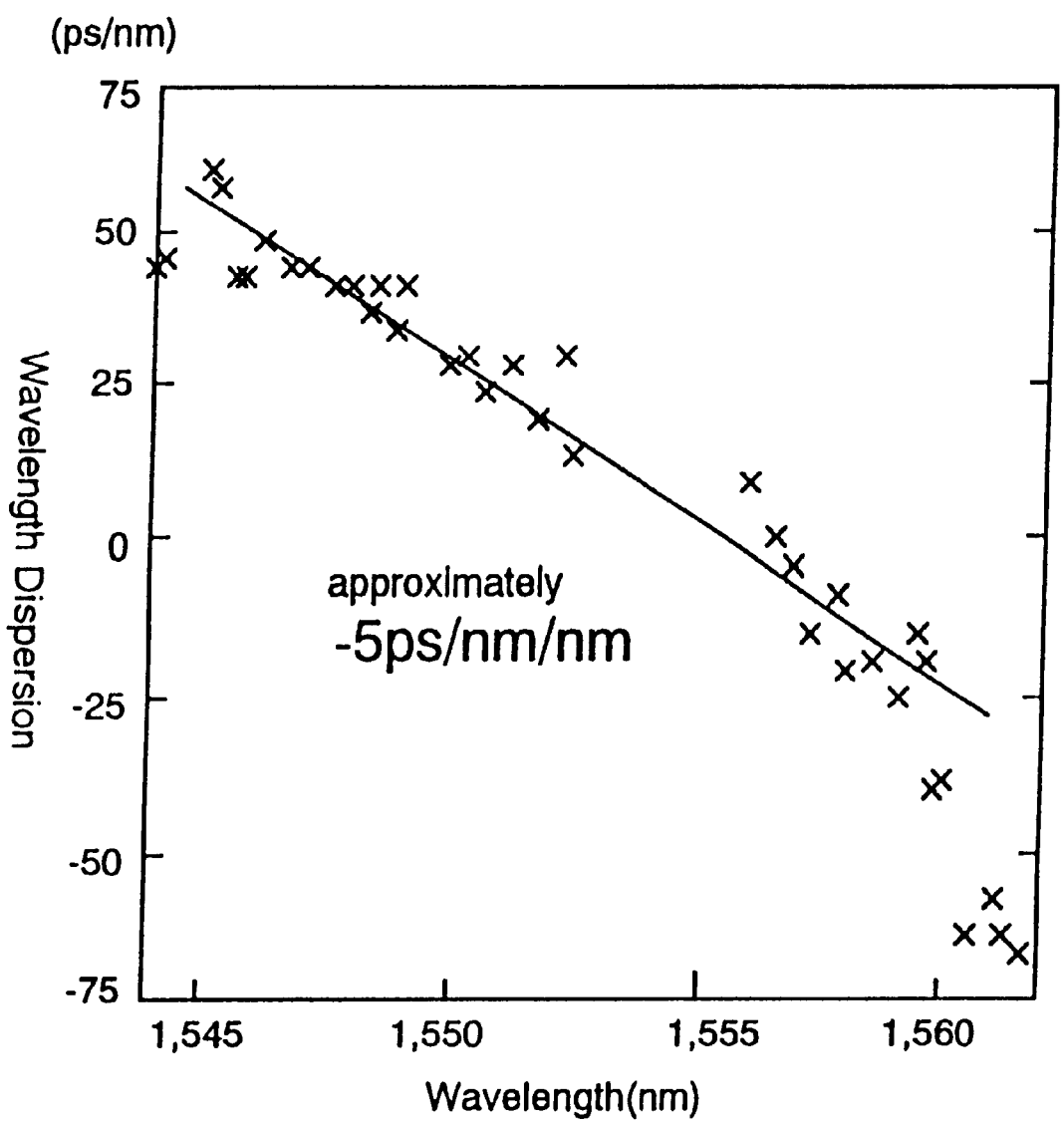
FIG. 9 is a diagram showing wavelength dispersion characteristics based on the group delay characteristics shown in FIG. 8.
Figure 10:
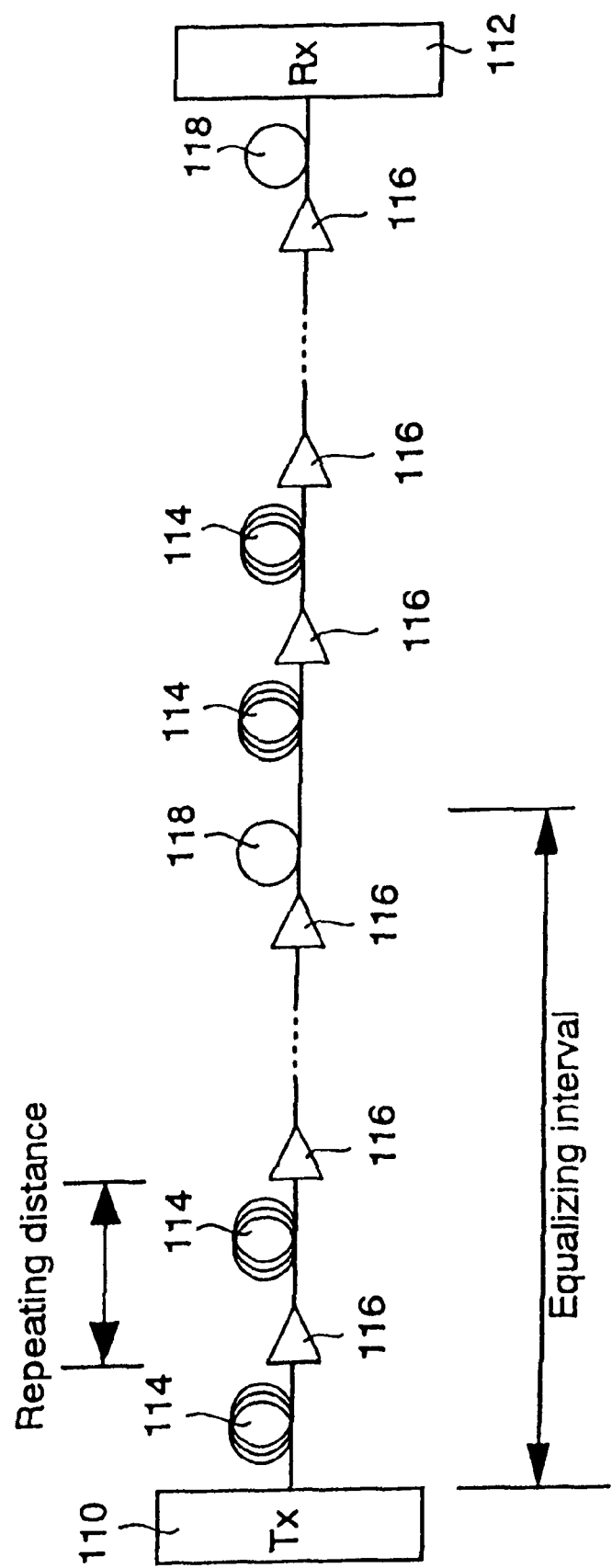
FIG. 10 is a diagram schematically showing a conventional system using a dispersion compensating system.
Figure 13:
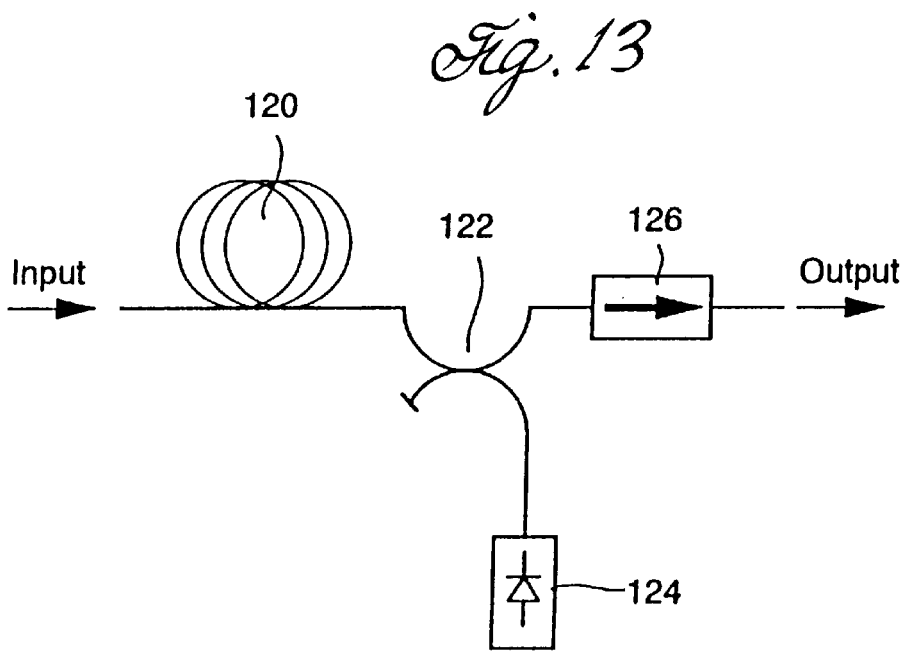
FIG. 13 is a diagram showing a general construction of an optical amplifying repeater 116 for the band of the wavelength 1,500 nm.
Figure 14:
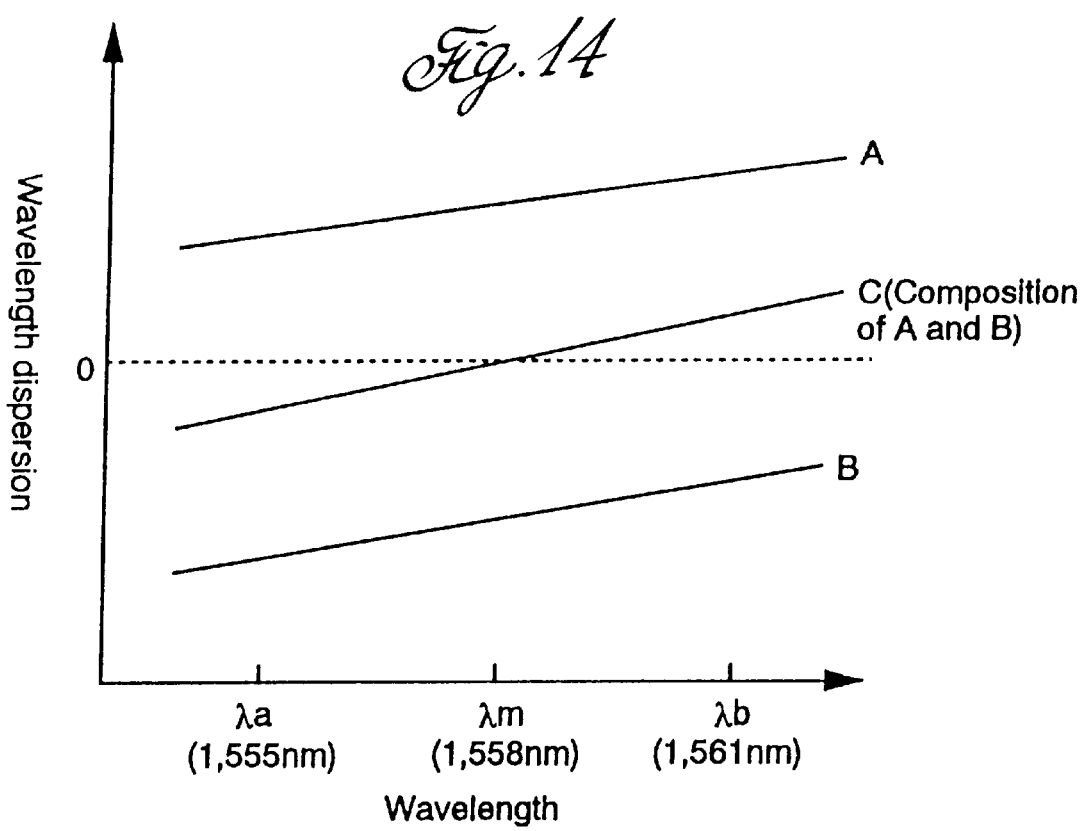
FIG. 14 is a diagram showing wavelength characteristics of wavelength dispersion of a transmission optical fiber 114 and an equalizing fiber 118.
Figure 15:
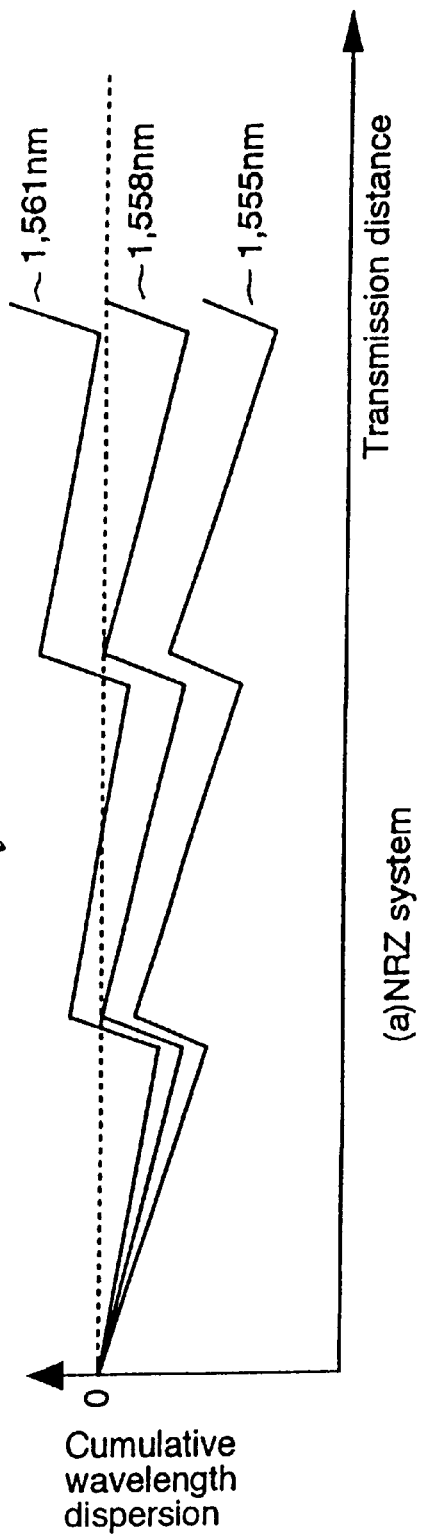
FIGS. 15 and 16 are diagrams of cumulative wavelength dispersion characteristics relative to transmission distances in transmission by a wavelength division multiplexing system using 1,555 nm, 1,558 nm and 1,561 nm for NRZ transmission system and for optical soliton transmission system.
Figure 16:
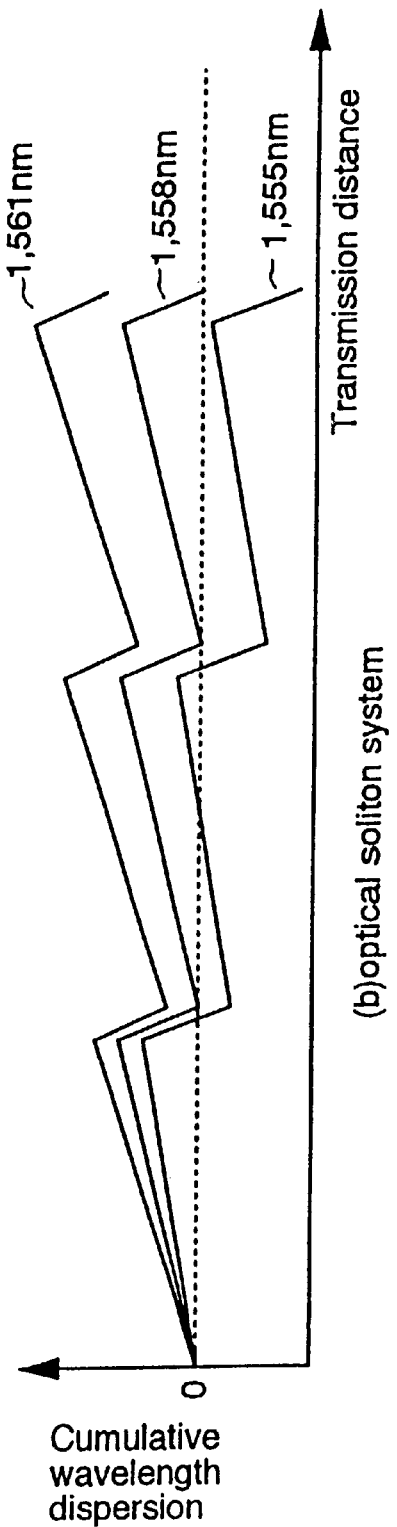

FIG. 8 shows group delay characteristics of the fiber grating shown in FIG. 7, and FIG. 9 shows wavelength dispersion characteristics based on the group delay characteristics. As shown in FIG. 9, wavelength dispersion is reduced to zero near 1,555 nm, and wavelength dispersion characteristics having a minus inclination relative to the wavelength can be realized. In FIG. 9, the inclination is about 5 ps for 1 nm of the wavelength. In the foregoing example of numerical values for NRZ transmission system, since the difference of 3 nm in signal wavelength results in the difference of 12 ps in wavelength dispersion, four optical amplifying repeaters among every five optical amplifying repeaters may be designed to include dispersion compensating optical elements 28 having the wavelength dispersion characteristics shown in FIG. 9.

That is, the invention does not require that all of the optical amplifying repeaters include the dispersion compensating optical element 28. Instead, an appropriate number of dispersion compensating optical elements 28 in accordance with the wavelength dispersion characteristics may be located in appropriate intervals.

Although the embodiment has been described as designing the dispersion compensating optical element 28 to have zero dispersion for a specific wavelength (1,558 nm, for example) and positive or negative wavelength dispersion for other wavelengths, it is not always necessary that wavelength dispersion be zero for a specific wavelength, provided that wavelength dispersion characteristics exhibit a minus inclination to the wavelength, because the wavelength dispersion to be added or subtracted by the dispersion compensating optical element can be compensated by the equalizing fiber 18 having such functions.

Those skilled in the art will understand from the foregoing description that the invention can greatly alleviate or remove the wavelength dependency of cumulative wavelength dispersion by compensating offset values in wavelength dispersion among different wavelengths into zero, for example, and can realize long-distance and/or wide-band transmission utilizing dispersion compensation even when a wavelength division multiplexing system is employed for transmission.

What is claimed is:

1. An optical transmission system, comprising:
   an optical transmission line;
   a plurality of equalizers arranged at a first interval from each other in said optical transmission line for compensating cumulative wavelength dispersion with a value adjusted to a specific wavelength; and
   a plurality of dispersion compensating optical elements arranged at a second interval from each other different from said first interval in said optical transmission line for reducing a difference in cumulative wavelength dispersion among a plurality of wavelengths in said optical transmission line.

2. The optical transmission system according to claim 1 wherein each of said dispersion compensating optical elements reduce the difference in wavelength dispersion in a predetermined range of wavelengths to substantially zero.

3. The optical transmission system according to claim 1 wherein each of said dispersion compensating optical elements provide substantially zero dispersion compensation for said specific wavelength, but compensates cumulative wavelength dispersion of another wavelength to substantially equalize it to the cumulative wavelength dispersion of said specific wavelength.

4. An optical transmission system, comprising:
   a transmission line comprising an optical transmission fiber for transmitting at least one optical signal, said at least one optical signal having a plurality of different wavelengths, said optical transmission fiber having inclined dispersion characteristics relative with wavelength;
   an optical transmitter for outputting said at least one optical signal onto said optical transmission line;
   an optical receiver for receiving said at least one optical signal transmitted through said optical transmission line;
   a plurality of equalizers arranged at a first interval from each other in said optical transmission line between said transmitter and receiver for compensating cumulative wavelength dispersion of a specific wavelength of said plurality of different wavelengths; and
   a plurality of dispersion compensating optical elements arranged at a second interval from each other different from the first interval in said optical transmission line between said transmitter and receiver for reducing a difference in wavelength dispersions of said plurality of different wavelengths in said optical transmission line.

5. The optical transmission system according to claim 4 wherein each of said dispersion compensating optical elements reduce the difference in wavelength dispersion among said plurality of different wavelengths to substantially zero.

6. The optical transmission system according to claim 4 wherein each of said dispersion compensating optical elements provide substantially zero dispersion compensation for said specific wavelength, but compensates cumulative wavelength dispersion of another wavelength to substantially equalize it to the cumulative wavelength dispersion of said specific wavelength.

\* \* \* \* \*